US008330741B1

(12) United States Patent
Camarota

(10) Patent No.: US 8,330,741 B1
(45) Date of Patent: Dec. 11, 2012

(54) MULTI-TOUCH DECODER FOR DIGITAL RESISTIVE SCREEN OVERLAY

(75) Inventor: Rafael Czernek Camarota, Los Gatos, CA (US)

(73) Assignee: Altera Corporation, San Jose, CA (US)

( * ) Notice: Subject to any disclaimer, the term of this patent is extended or adjusted under 35 U.S.C. 154(b) by 628 days.

(21) Appl. No.: 12/549,814

(22) Filed: Aug. 28, 2009

(51) Int. Cl.
*G06F 3/045* (2006.01)

(52) U.S. Cl. ........................................................ 345/174

(58) Field of Classification Search .................. None
See application file for complete search history.

(56) References Cited

U.S. PATENT DOCUMENTS

| 6,856,259 | B1* | 2/2005 | Sharp ................................. 341/5 |
| 2010/0066567 | A1* | 3/2010 | Dietz et al. ...................... 341/22 |
| 2010/0097343 | A1* | 4/2010 | Fang .............................. 345/174 |

* cited by examiner

*Primary Examiner* — Hoa T Nguyen

*Assistant Examiner* — Mark Fischer

(74) *Attorney, Agent, or Firm* — Womble Carlyle Sandridge & Rice, LLP

(57) ABSTRACT

Methods, Integrated Circuits (IC) and computer programs for decoding contacts in a digital resistive screen overlay (DRSO) are presented. The method includes coupling in succession columns of the DRSO to a first voltage while floating a remainder of the columns. Further, the method includes the operation of checking during a sampling time if each row of the DRSO is connected through closed switches in the DRSO to the column coupled to the first voltage. The sampling time is configured such that the sampling time for a given row is previous to the arrival time of a signal that started with the coupling of a column and that propagated to the given row through more than one closed switch in the DRSO.

20 Claims, 14 Drawing Sheets

Column 5 SFT to SEN delay increased

Column 0 SFT to SEN delay shortened

MULTI-TOUCH DECODER FOR DIGITAL RESISTIVE SCREEN OVERLAY

BACKGROUND

A touchscreen is a display that can detect the presence and location of a touch within the display area. One type of touchscreen is the analog resistive screen which is composed of several layers. When an object, such as a finger, presses down on a point on the screen's outer surface two metallic layers become connected at that point and the screen behaves as a pair of voltage dividers with connected outputs, causing the change in the electrical current to be registered as a touch event. Analog resistive touch screens allow only one point in the screen at a time to be decoded and work with a variety of input methods such as finger, stylus, gloves, and fingernails. It is a durable technology that is used in a wide range of applications including point-of-sale systems, industrial controls, and public information kiosks.

A capacitive touchscreen panel is a sensor typically made of glass coated with a material such as indium tin oxide. The sensor is a capacitor in which the plates are the overlapping areas between the horizontal and vertical axes in a grid pattern. It is a durable technology that is primarily used in consumer portable applications including cell phones and media players. Capacitive touch screens have a higher clarity than analog resistive screens, but they only respond to finger contact and will not work with a gloved hand or pen stylus. Capacitive touch screens can support multi-touch decoding.

Digital resistive touch screens include rows on one layer and columns on an opposite layer, the rows and columns forming a matrix of switches. Digital resistive touch screens are popular when finger size touch zones are required. Interfacing with digital touch screens is as easy as interfacing with a keyboard matrix. However, multi-touch is difficult to decode in digital resistive touch screens.

New applications require multi-touch screens that allow simultaneous detection of multiple touch points to enhance the user-machine interface. Dynamic examples include gesture commands, rotation control, zoom, gaming inputs, etc. Multi-touch applications are still evolving as user interfaces improve with the possibility of multi-touch. Some of the applications that can benefit from multi-touch technology are medical imaging (ultrasound, X-rays, MRI image manipulation), kiosks (photo printing, vending, maps), music and video players, home appliances, etc.

It is in this context that embodiments of the invention arise.

SUMMARY

Embodiments of the present invention provide methods, Integrated Circuits (IC) and computer programs for decoding contacts in a digital resistive screen overlay (DRSO). The method includes coupling in succession columns of the DRSO to a first voltage while floating a remainder of the columns. Further, the method includes the operation of checking during a sampling time if each row of the DRSO is connected through closed switches in the DRSO to the column coupled to the first voltage. The sampling time is configured such that the sampling time for a given row is previous to the arrival time of a signal that started with the coupling of a column and that propagated to the given row through more than one closed switch in the DRSO.

In one embodiment, an IC for decoding contacts in a DRSO is provided. The IC includes a column driver module, a core module, and a timing module. The column driver module couples a column of the DRSO corresponding to a received column address to a first voltage while floating a remainder of the columns. The core module sends the column address to the column driver module and checks, during a sampling time, if each row of the DRSO is connected through closed switches in the DRSO to the first voltage. In addition, the timing module determines the sampling time such that the sampling time for each row occurs before an arrival time of a signal that started with the coupling of the column and that propagated to the each row through more than one closed switch in the DRSO.

In another embodiment, an Integrated Circuit for decoding contacts in a DRSO includes an input/output (I/O) module, a column decoder, a row data register, and a timing control module. The I/O module reads control data which includes a column address and a delay counter. The column decoder receives the column address and couples a column of the DRSO, which corresponds to the column address, to a first voltage while floating a remainder of the columns. Further, the row data register receives the logical value of the rows of the DRSO which indicate if the rows of the DRSO are being contacted. The timing control module generates a column signal to indicate when the column decoder starts coupling the column, and a row signal to indicate when to read the logical values of the rows. The signal is based on the delay counter, and the I/O module returns the logical values of the rows from the row data register.

It should be appreciated that the present invention can be implemented in numerous ways, such as a process, an apparatus, a system, a device or a method on a computer readable medium. Several inventive embodiments of the present invention are described below.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe a method and apparatus for decoding contacts in a digital resistive screen overlay (DRSO). It will be obvious, however, to one skilled in the art, that the present invention may be practiced without some or all of these specific details. In other instances, well known process operations have not been described in detail in order not to unnecessarily obscure the present invention.

Figure 1:
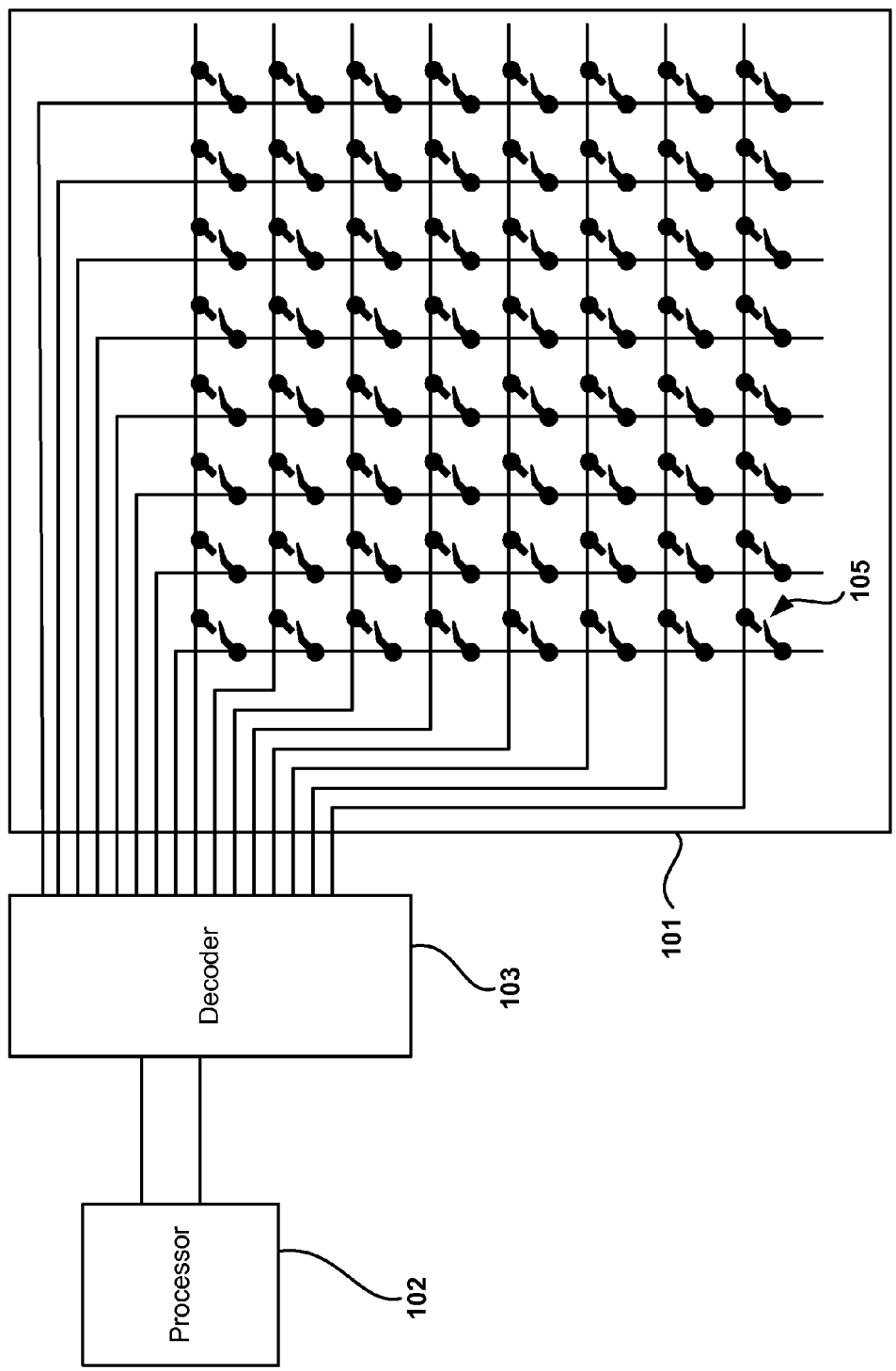
FIG. 1 depicts a digital resistive screen overlay.

FIG. 1 depicts a digital resistive screen overlay. In one embodiment, the screen system includes touch screen 101, such as NKK Digital SmartTouch™ FTAS225-57AN, which is a 5.7" diagonal digital resistive touch screen overlay with a 15×15 touch point matrix. FIG. 1 depicts an exemplary 8×8 digital resistive screen, but embodiments of the invention can be used with other screen sizes, such as 42×36, 15×15, etc. The second component in the system is decoder 103 which connects to the screen. One such decoder is the assignee's MAX IIZ ultra low power EPM240ZM100C7N CPLD. No other components are necessary to connect the Digital Smart-Touch screen to a system processor Inter-Integrated Circuit ($I^2C$) or System Packet Interface (SPI) port. One skilled in the art will appreciate that $I^2C$ is a multi-master serial computer bus used to attach low-speed peripherals to a motherboard, embedded system, or cell phone. A processor 102 interfaces with decoder 103 to obtain information about the current state of touch screen 101.

There is a switch for each row and column intersection in touch screen 101, such as switch 105 between the left column and the bottom row of touch screen 101. Absent a contact on touch screen 101 all the switches are in the open state. When a touch takes place on touch screen 101, the corresponding switch closes making an electrical connection between the row and the column. Decoder 103 has the rows and columns as I/Os and operates by detecting the switch closing that corresponds to the contact or contacts on the screen.

The touch screen decoder shares similarities with a key pad matrix, therefore Programmable Logic Devices (PLD), such as the MAX IIZ, are well suited for this type of application. A PLD makes an excellent DRSO decoder because of the abundance of I/Os available to allow decoding for large screens or for small screens with very fine grids. A PLD enables the user to custom tune the timing of the drive and sense circuits such that the decoding accuracy is optimized and the amount of calibration and set-up required are minimized. Finally, the DRSO can be decoded in such a way that it is possible to accurately decode one, two, three, and more simultaneous touches with minimum error.

Figure 2:
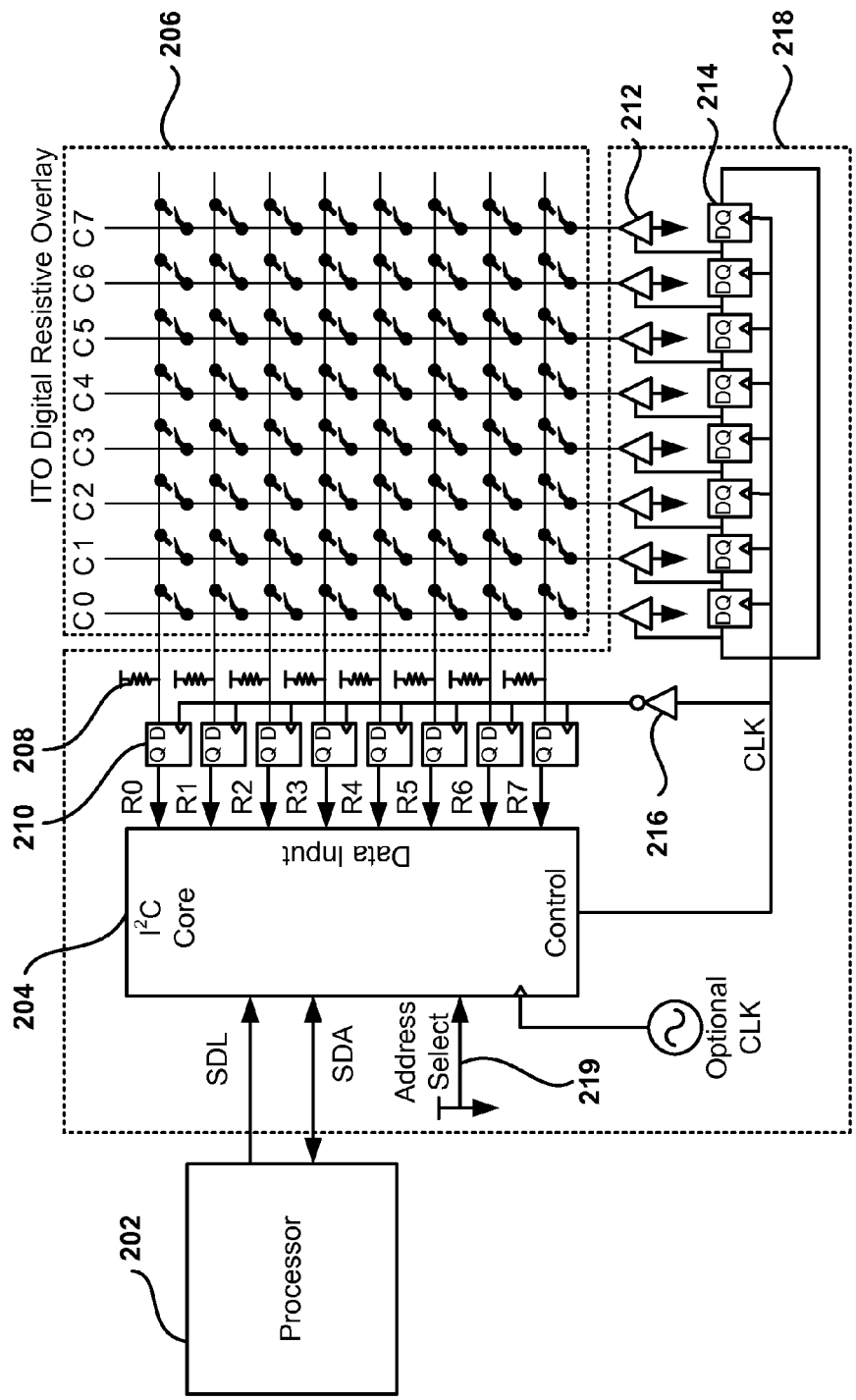
FIG. 2 illustrates an embodiment of a system for decoding contacts in the digital resistive screen overlay.

FIG. 2 illustrates an embodiment of a system for decoding contacts in digital resistive screen overlay 206. The 8×8 key matrix is decoded by connecting the rows of the matrix to the inputs of respective registers 210, each of which has weak pull-up resistor 208 attached. In one embodiment, a single column at a time is connected to ground while the remaining columns float. When the screen is touched on the column grounded, the corresponding row register 210 loads a logic low value and all other registers 210 loads a logic high value. Processor 202 communicates with $I^2C$ core module 204 via an $I^2C$ serial bus in one embodiment. Although embodiments of the present invention are presented using an $I^2C$ interface, the principles of the invention can be implemented with any suitable serial or parallel interface, such as Joint Test Action Group (JTAG), Secure Digital Input Output (SDIO), System Management Bus (SMBus), System Packet Interface (SPI), Power Management Bus (PMBus), Z80, 8088, 6800, 8051, etc.

$I^2C$ core module 204 reads the content of register 210 for each of the rows and then sends the results in binary format back to processor 202. Processor 202 can be a processor external to IC 218 or can be integrated with IC 218. $I^2C$ core module 204 has a unique address 219, which is hard coded or set by the PLD pins. When processor 202 sends a read command to IC 218, IC 218 returns 8 bytes of data representing the 8 columns and 8 rows of switches on DRSO 206. Before each word is shifted out, the $I^2C$ Serial Data (SDA) port sends a clock pulse to the row registers 210 and column registers 214. Each column register 214 is connected to the output enable pin of buffer 212. The column registers are shifted every clock cycle such that column C0 is driven low first, while the other columns float, then column C1 is driven low during the next clock cycle while the remaining columns float, etc. When the signal coming out of register 214 is a logical high value, then buffer 212 is switched on connecting ground to the corresponding column of the DSRO. When register 214 output is a logical low value the respective column will be tri-stated. The bit in register 214, also referred to herein as the shift register, will shift right to the input of the next register 214 on the rising edge of the sample clock. The row register 210 samples the row signals on the falling edge of the sample clock because register 210 is connected to the CLK signal through inverter 216. This gives the column signal, which started on the raising edge of the clock, enough time to propagate through the DRSO. In this example, when the columns are driven low no row lines are driven low because all the switches are open in the DRSO.

Figure 3B:
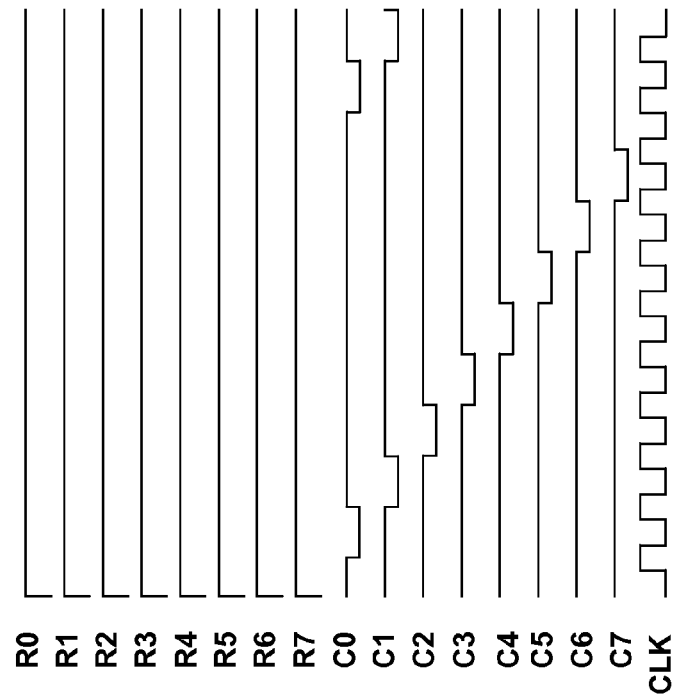
FIGS. 3A-B illustrate the circuit used for decoding touches in the DRSO and waveforms in the DRSO absent any contact, according to one embodiment.
Figure 3A:
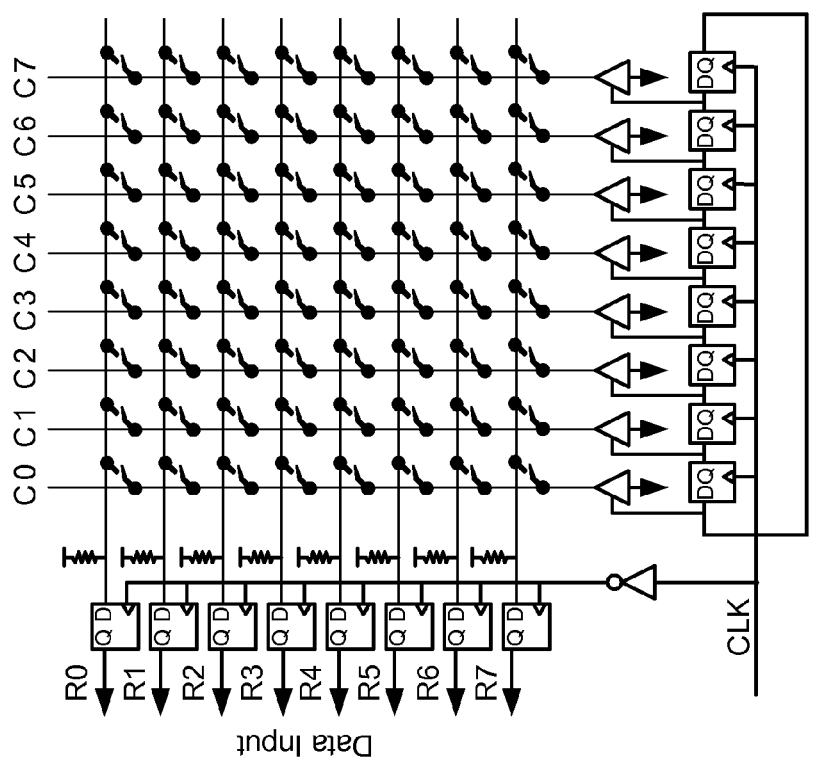

FIGS. 3A-B illustrate the circuit used for decoding touches in the DRSO and waveforms in the DRSO absent any contact, according to one embodiment. FIG. 3A shows a portion of the decoder, as previously described with reference to FIG. 2. FIG. 3B is a timing diagram illustrating how the columns are driven low successively in one embodiment. Clock signal CLK drives the change in the column that is driven low while the rest of the columns float. The waveforms for the row inputs are all driven high as the weak pull-up resistors prevent electrical signals from the columns from propagating to the rows as all the switches in the DSRO are open.

Figure 4B:
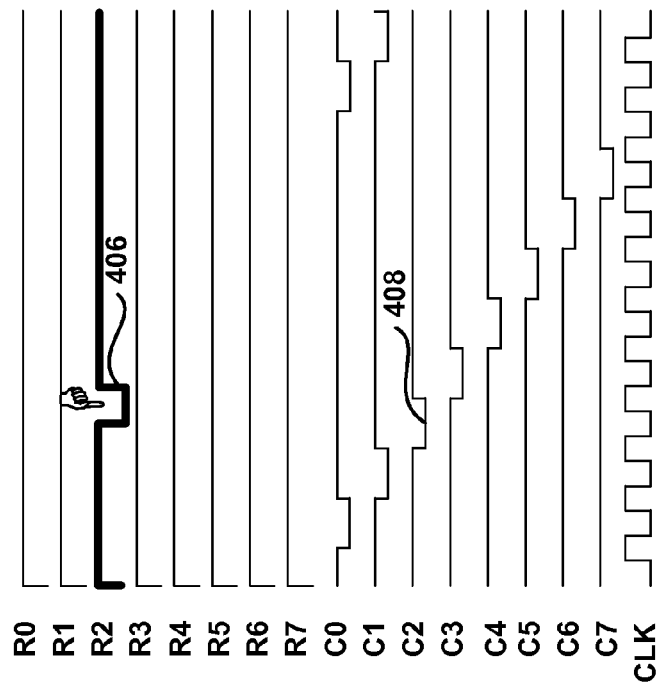
FIGS. 4A-B illustrate the signal path and waveforms when there is one touch on the DRSO, according to one embodiment.
Figure 4A:
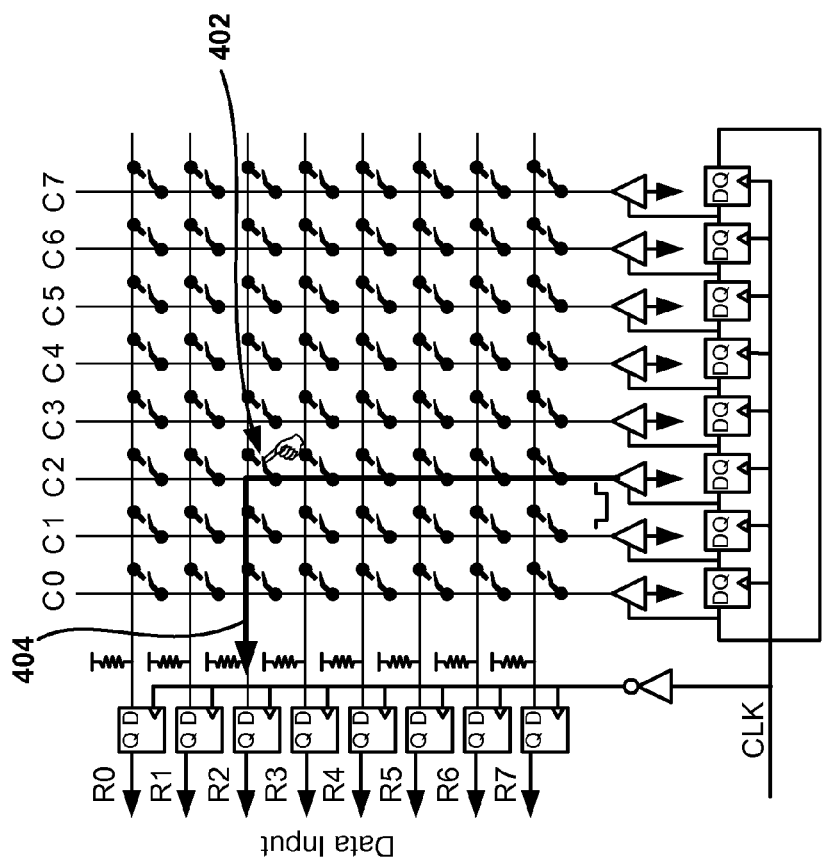

FIGS. 4A-B illustrate the signal path and waveforms when there is one touch on the DRSO, according to one embodiment. Touch 402 on column C2, row R2 on the screen closes the corresponding switch, which causes a low pulse 406 on the signal for row R2 during C2 sample period 408. The signal from C2 is propagated via path 404 to the register connected to R2. The $I^2C$ core module sends 8 bytes of data to the processor each time the display is scanned, one byte per column, and one bit in each byte per row.

Figure 5B:
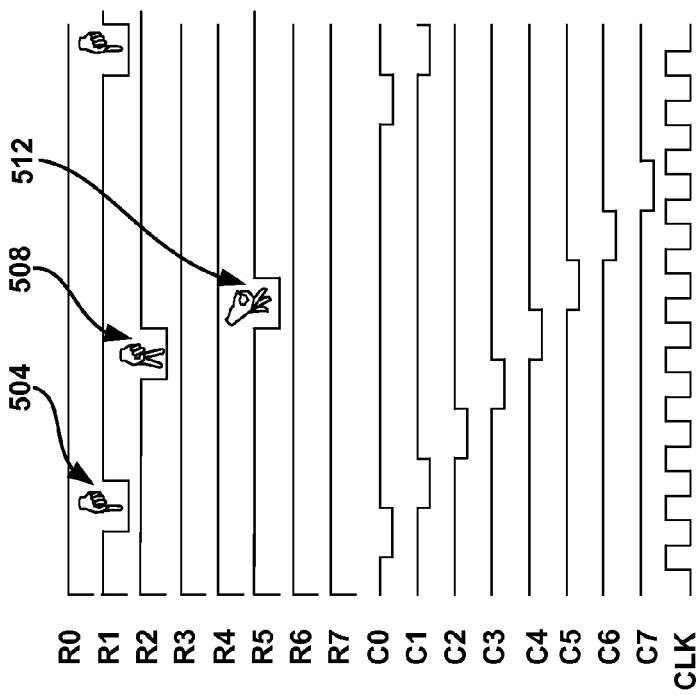
FIGS. 5A-B illustrate the signal paths and waveforms when there are three touches in the DRSO, according to one embodiment.
Figure 5A:
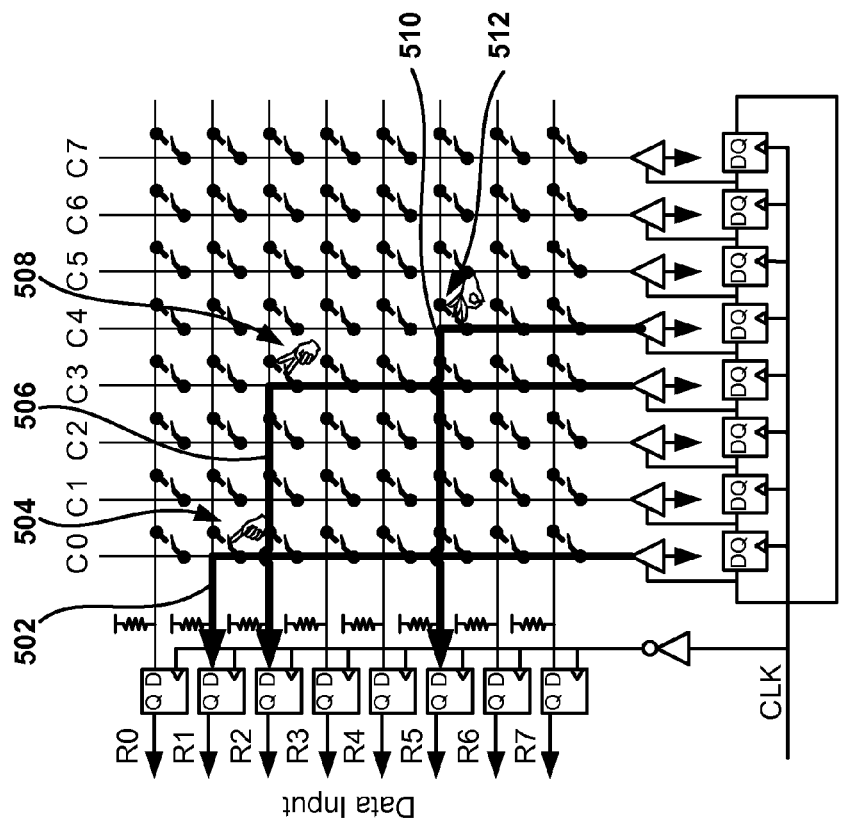

FIGS. 5A-B illustrate the signal paths and waveforms when there are three touches in the DRSO, according to one embodiment. FIG. 5A shows the switching of the row and column signals during a sample cycle when the screen is being touched at points 504, 508, and 512. In this scenario, as the columns are driven low the row lines corresponding to the respective finger touches also are driven low. Path 502 shows the electrical path from C0 to R1 through the switch closed by touch 504. Similarly, paths 506 and 510 show the electrical communication from C3 to R2 and from C4 to R5, respectively. In this example the decoder correctly decodes the simultaneous touch of the screen in three places because no signal that originated at one of the columns is propagated to an unintended row.

Figure 6B:
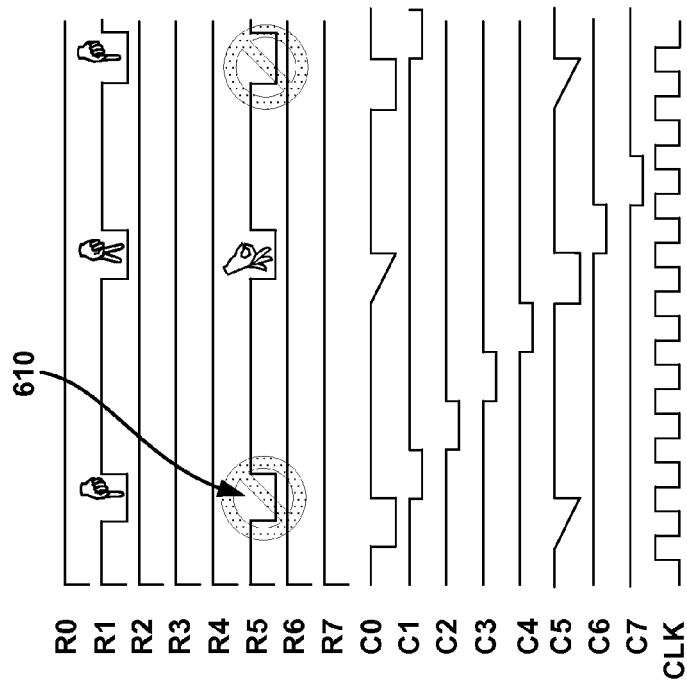
FIGS. 6A-B illustrate the decoding of a false touch in the DRSO during a multi-touch, according to one embodiment.
Figure 6A:
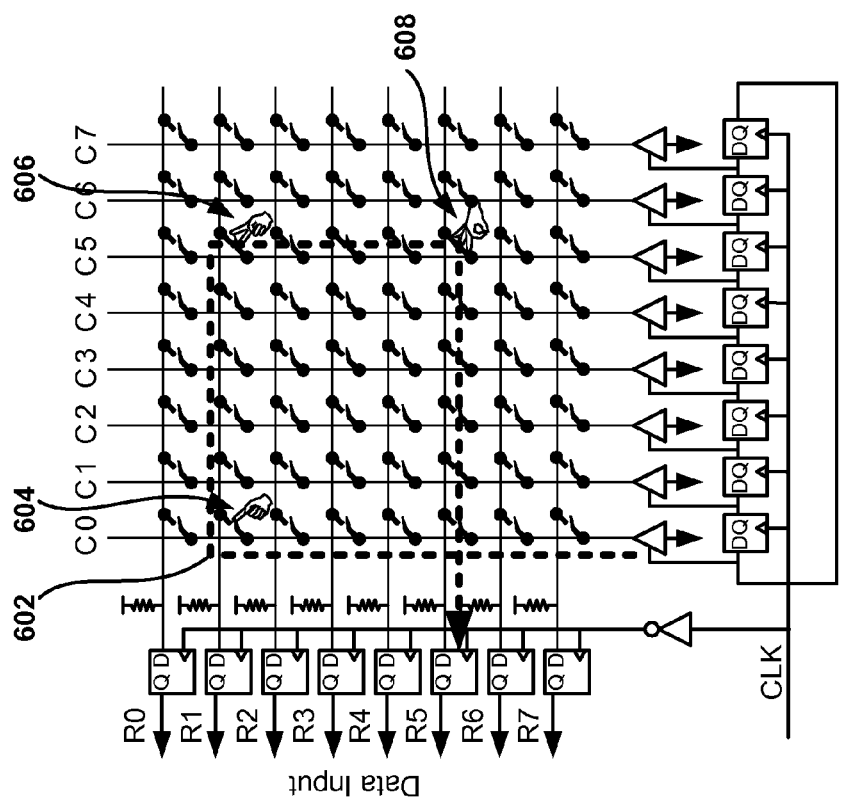

FIGS. 6A-B illustrate the decoding of a false touch in the DRSO during a multi-touch, according to one embodiment. Under certain three-finger touch conditions, such as the one shown in FIGS. 6A-B, the decoder reports a false touch decode, which is referred to as an alias. The three touch points form a triangle with two points sharing a common row and two points sharing a common column. Electrical alias path 602 is created from Column C0 to row R5 through contacts 604, 606, and 608. The result is a false reading on row 5 recorded into register R5. This assumes that the shift-to-sample delay is slow allowing the signal to propagate through the four traces and the three switches. The circuit of FIG. 6A accurately decodes one or two touch patterns, and accurately decodes a pattern with more than two touches when there is not more than one touch on any given column. This is referred to as a linear pattern. The troublesome pattern is referred to as a triangle pattern. FIG. 6B shows alias decode pulse 610 caused by alias path 602.

Figure 7:
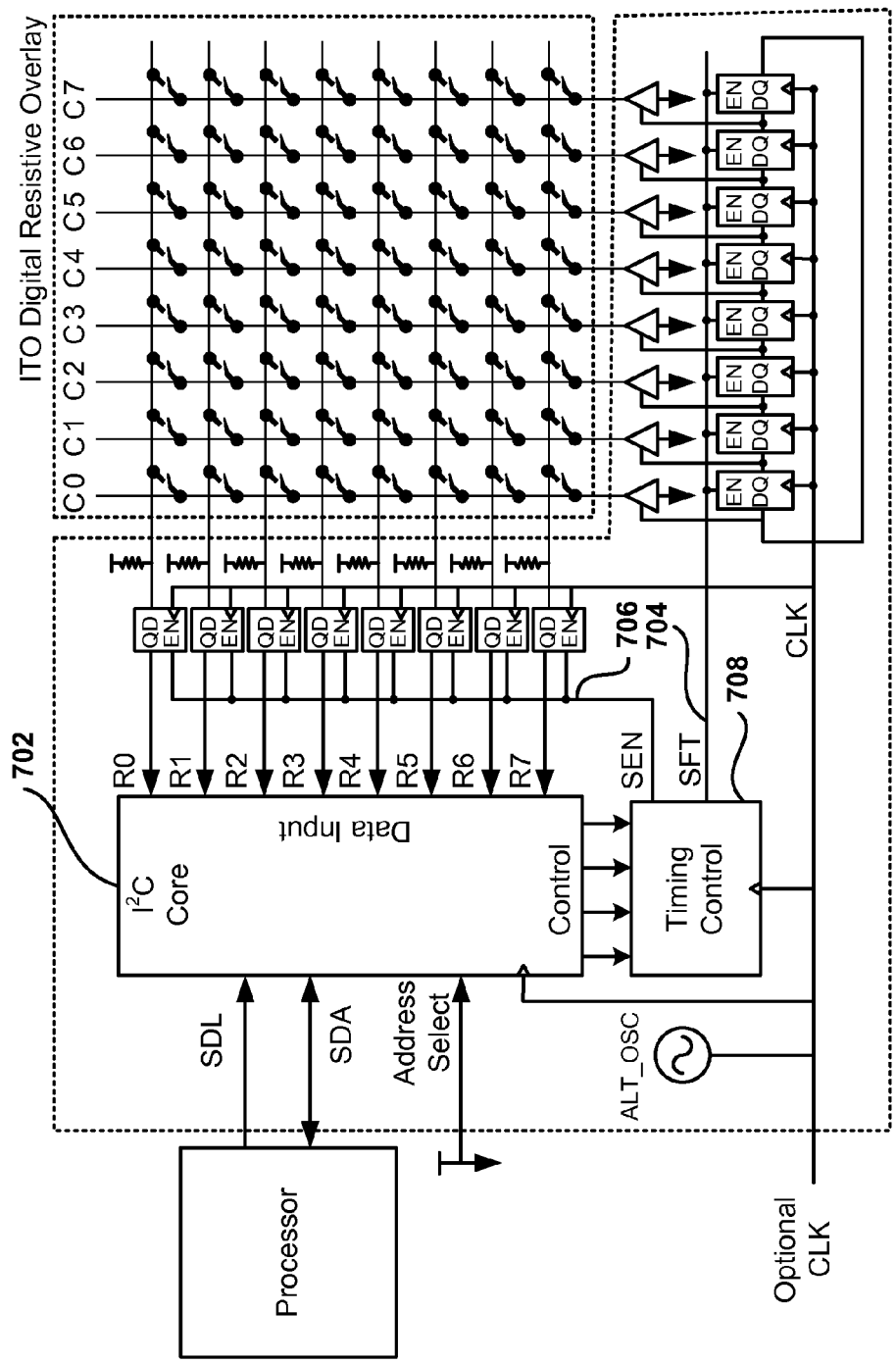
FIG. 7 illustrates an embodiment of an alias-eliminating circuit for multi-touch decoding.

FIG. 7 illustrates an embodiment of an alias-eliminating circuit for multi-touch decoding. The clock speed in the circuit of FIG. 7 is increased by a factor between 10 and 100, i.e., at least an order of magnitude, to better control the setting and sampling of the signals that drive and sample the screen. For example, the clock rate can be increased from 100 KHz to 4 MHz in I²C core module 702. Timing control block 708 controls the sample enable (SEN) 706 and synchronous shift (SFT) 704 signals to enable sample delay adjustments. Further, the signal at each row can be independently controlled by timing control block 708. In the embodiment of FIG. 7, the rows are all sampled at the same time because the SEN 706 signal is common to all row registers. In another embodiment, timing control block 708 generates more than one SEN signal, such as generating a different SEN signal for each row, or producing SEN signals that control a group of rows. For instance, timing control block 708 can produce four different SEN signals for the eight rows, thus grouping the rows in pairs for sampling by a common SEN signal. The different row signals are adjusted to account for the longer propagation path of the electrical signals from the column drivers at the bottom to the rows closer to the top.

Figures 8A, 8B:
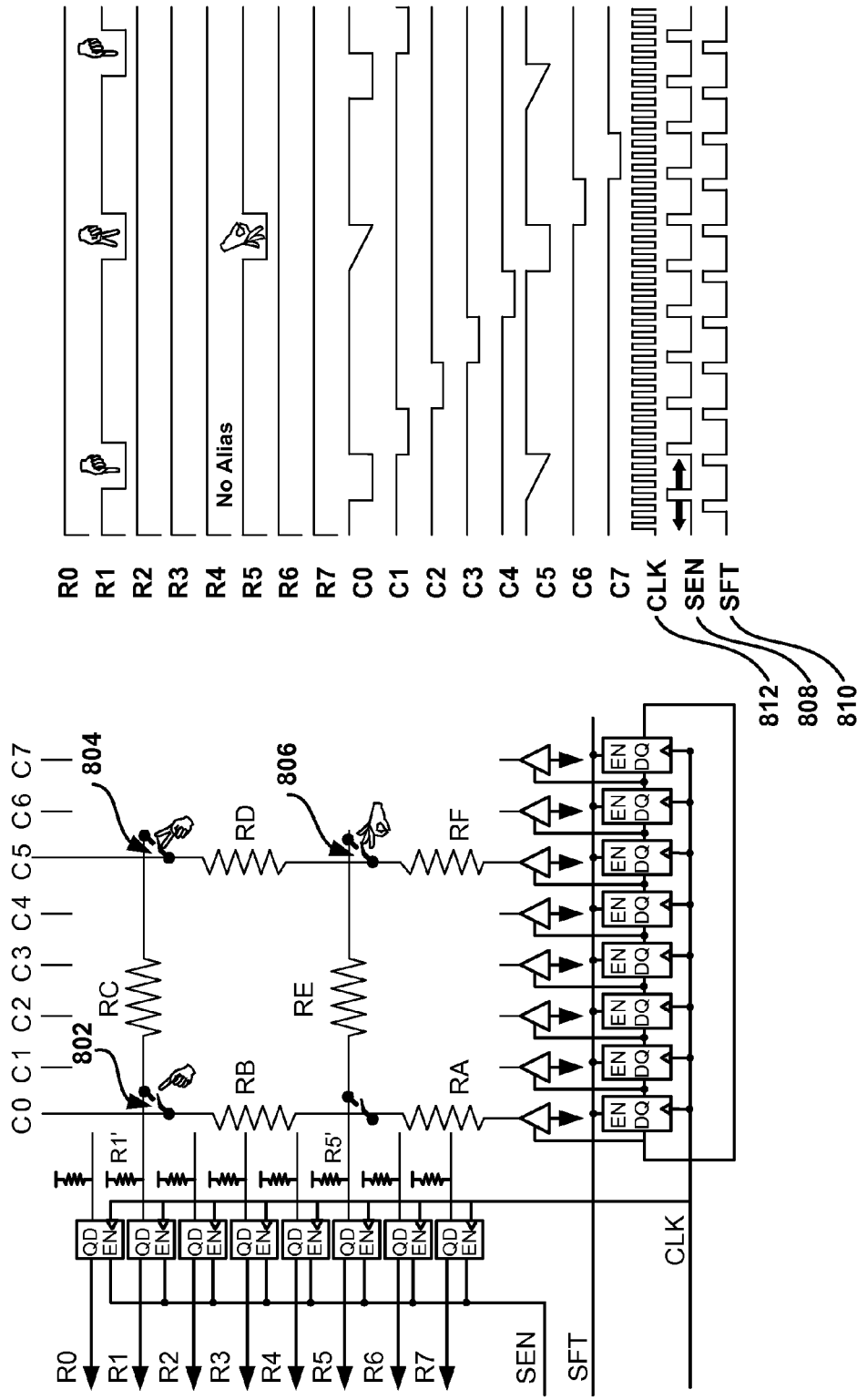
FIGS. 8A-B detail the electrical characteristics of the DRSO and the elimination of aliases, in accordance with one embodiment.

FIGS. 8A-B detail the electrical characteristics of the DRSO and the elimination of aliases, in accordance with one embodiment. The touch screen path that creates the alias is shown in more detail including the Indium Tin Oxide (ITO) trace resistances RA to RE. Because of electrical resistance, the delay from finger touch 802 to an alias pulse on row 5 is significant and therefore can be ignored by controlling the sample enable timing. It should be appreciated that as long as the sampling time for the row occurs before a signal can propagate from a column driver to the row register through more than one of the switches of the DRSO, then aliases will be eliminated.

SEN 808 signal is used to avoid aliases by advancing or retarding the sampling time of the row registers. It should be noted, that the waveform for CLK 812 is not to scale because in an actual system the clock is typically much faster than SEN 808 and SFT 810 signals. In this example CLK 812 is shown slower for clarity. FIGS. 8A-B show the improved circuit that correctly decodes a three point triangle touch pattern. SFT 810 timing is such that the shift-to-sample delay is the same as with the decoder of FIG. 7. SEN signal 808 is controllable to advance or retard the shift-to-sample delay.

The switch matrix is simplified to show the series resistance of the active row, column, and switch elements. For an alias signal going low to propagate from Column 0 to an incorrect row, the alias signal must travel through RA, RB, the switch at touch 802, RC, the switch at 804, RD, the switch at 806, and RE. All this resistance and capacitance will make the signal arrive later to the row register than in the case of an actual touch point decode. The improved circuit takes advantage of this delay to avoid detecting alias decodes by shortening the shift to sample delay time. The intended decode meets the row register set-up time while the alias decode is too slow to meet the row set-up time and therefore the alias is masked.

Figure 9B:
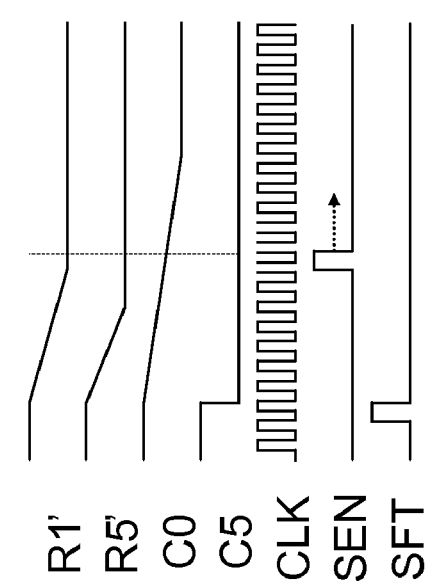
FIGS. 9A-B illustrate an embodiment for adjusting timing to eliminate aliases.
Figure 9A:
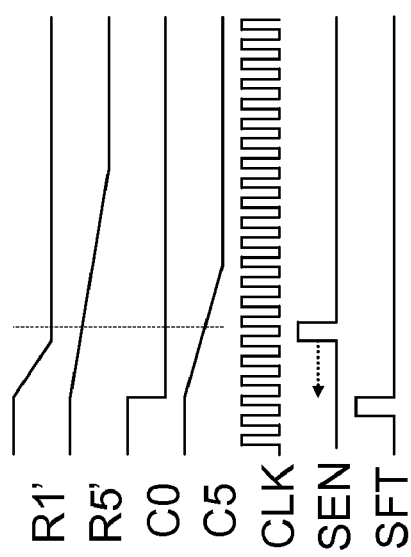

FIGS. 9A-B illustrate an embodiment for adjusting timing to eliminate aliases, with a more detailed representation of the ability to increase and decrease the sampling delay to increase decode accuracy. FIG. 9A shows a faster clock allowing for a finer delay adjustment. The wave forms show how the nodes slow as the nodes get further from the C0 driver. The SFT to SEN delay is adjusted until the intended R1' low signal is read correctly but the incorrect R5' low signal is ignored. Since ICs, and PLDs in particular, are flexible, this delay can be hard coded into the design or can be changed dynamically.

The wave forms in FIG. 9B illustrate another decoding issue faced by large DRSO circuits. In a very large DRSO, the column drive transition to row capture register delay may vary greatly from side to side of the screen, and more specifically from corner to corner. In such a system the SEN signal can be advanced or retarded such that each row and column has the same sensitivity to a touch decode no matter where on the screen SEN signal is with respect to the column drivers and the row capture registers.

Figure 10A:
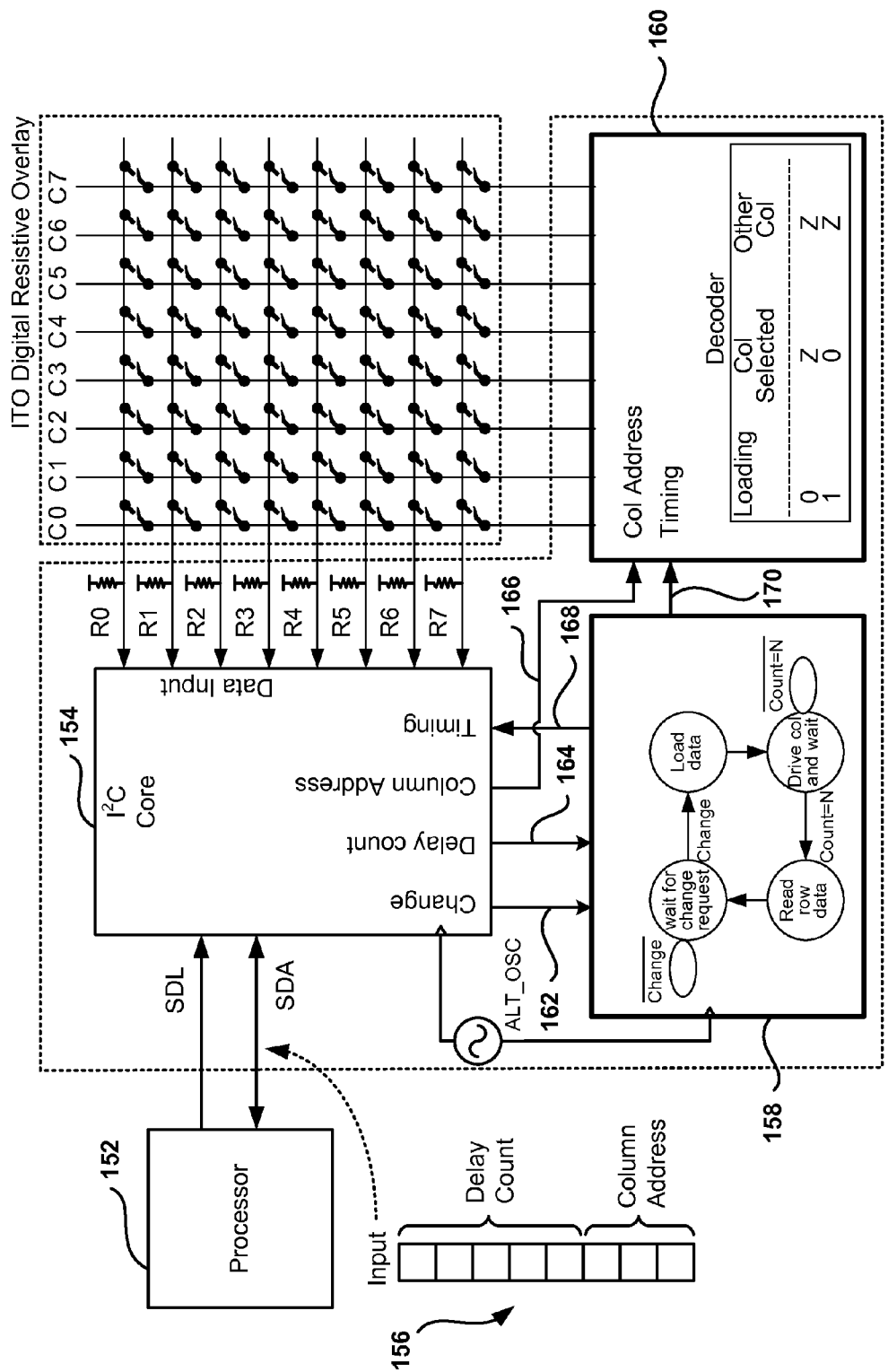
FIGS. 10A-B illustrate an alias-eliminating circuit implemented in an integrated circuit (IC), in accordance with one embodiment.
Figure 10B:
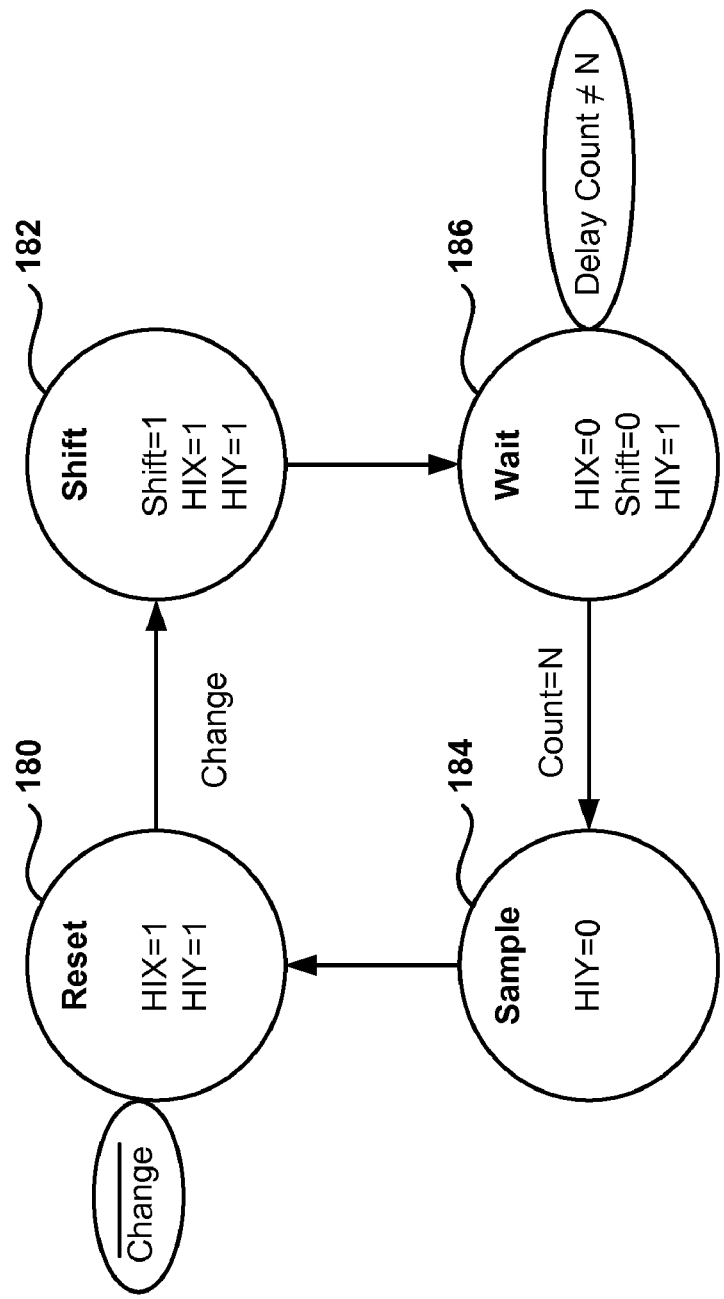

FIGS. 10A-B illustrate an alias-eliminating circuit implemented in an integrated circuit (IC), in accordance with one embodiment. Processor 152 communicates with I²C core module 154 and sends an 8-bit data packet 156 to start a keypad scan. The 8-bit data packet 156 is divided into two parts, the column address (for C0 to C7, 3 bits) and the delay count (5 bits), which is used to fine tune the timing for sampling the row inputs. When I²C core module 154 detects that processor 152 has data to be read, then I²C core module 154 sets change signal 162 to start the timing process which is controlled by timing module 158. Details for timing module 158 are given below in reference to FIG. 10B.

Once timing module 158 detects the transition of Change signal 162, timing module 158 sends a signal to I²C core module 154 to read the data from the I²C bus. Column driver module 160 receives column address 166 and timing signal 170 in order to drive one column low, while floating the rest of the columns. Timing module 158 waits for a period determined by the delay count 164 received from processor 152 via I²C core module 154. Once the wait period is over, timing module 158 sends a timing signal to I²C core module 154 to sample the data inputs connected to the screen rows.

Column driver module 160 floats all the columns while loading signal 170 is logic 0. When the loading signal transitions to a logic 1, the column corresponding to the column address 166 is driven low while the rest of the columns continue to float. The time between driving a column low and sampling each row is adjusted based on touch screen and PCB characteristics. The time for sampling a row is adjusted such that an intended touch causes the corresponding row to be driven low during the sampling time, but an unintended touch does not drive the row low during the sampling time because the signal from the column has not propagated yet to the row as the signal has to propagate through multiple switches and traces. It should be appreciated that the embodiments illustrated in FIGS. 2-10A are exemplary circuits for decoding contacts in the DRSO. Other embodiments may utilize different logic values, drive the circuit timing during raising or falling clock signals, or detect switches closing in the DRSO in varying manners, such as driving voltages on the rows of the DRSO and reading column values. The embodiments illustrated in FIGS. 2-10A should therefore not be interpreted to be exclusive or limiting, but rather exemplary or illustrative.

In another embodiment, I²C core module 154 receives a contact detect request to detect if there is any contact in the DRSO. Column driver module 160 drives all the columns low simultaneously in response to the contact detect request. Then all the rows are sampled as previously described, and if any row is driven low, then I²C core module 154 responds with a signal indicating that there is a touch on the screen. In yet another embodiment, the contact detect request is performed periodically by I²C core module 154 when a processor is in a low power standby state. When I²C core module 154 detects a touch on the screen, I²C core module 154 uses an interrupt to wake the processor.

FIG. 10B shows the detailed state machine for timing control block 158. The state machine has four states. In Reset state 180, the state machine waits for the Change signal to flip. In the Reset state, signals HIX and HIY are logical high values. HIX and HIY are used to drive the rows and columns to high, in order to initialize the device. Once the Change signal arrives, the state machine transitions to Shift state 182 where the Shift signal is set to a logical high value. The Shift signal is sent to the I²C core module in order to load the data from the I²C bus. HIX is still logic high because the column is not driven to low yet. Now the system has the address information and the delay information needed for the scan.

The next transition is from Shift state 182 to Wait state 184, where SFT and HIX are set to logical low values to drive low the column indicated by column address 166 of FIG. 10A. The column that is active is driven to 0 and all the other columns float. The rows are still floating as the system waits for the signal for that low column to propagate to the different rows. A counter is started, and once the counter reaches the number associated with the delay count, the state machine transitions to Sample 186 state, where HIY is driven to 0 and communicated to the I²C core module to initiate the reading of the inputs connected to the screen rows.

In this embodiment, each column is addressed separately and the sampling time for reading the rows is adjusted accordingly to the column. For example, column C0 can have a delay of 3 while column C6 can have a delay of 6, but other values are also possible depending on the DRSO.

Figure 11:
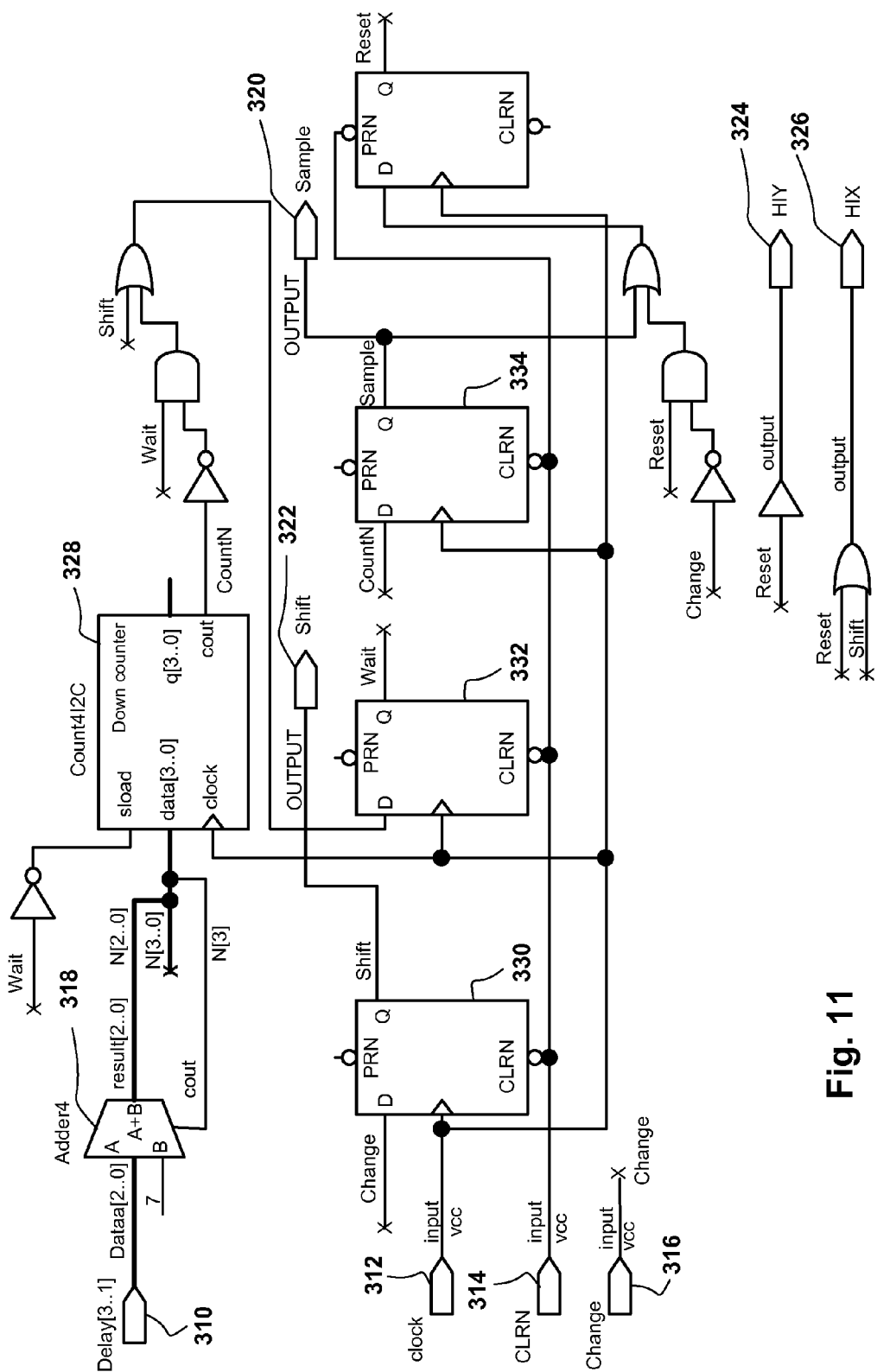
FIG. 11 shows an embodiment of a timing control circuit.

FIG. 11 shows an embodiment of a timing control circuit. The inputs include delay 310, clock 312, CLRN 314 to reset the system, and Change 316, which was previously described in reference to FIGS. 10A-B. Delay [3 . . . 1] controls the delay used to sample the rows and is the delay from the time that HIY and HIX go low to the time that the Sample pulse goes high. The output of adder 318 is an N value, which is the one used by the state machine to introduce the delay. Counter 328 performs the count for the state machine, as seen in FIG. 10B.

The outputs of the timing control module include Sample 320, Shift 322, HIY 324, and HIX 326. Sample 320 is used to indicate to the I²C core module when to read the data. HIX 326 and HIY 324 indicate when to drive or sample the rows and columns respectively. When HIY is 1 then the columns are driven high, and when HIX is 1 then the rows are forced high. Registers 330, 332, and 334 are used to implement the logic that drives the outputs.

Figure 12:
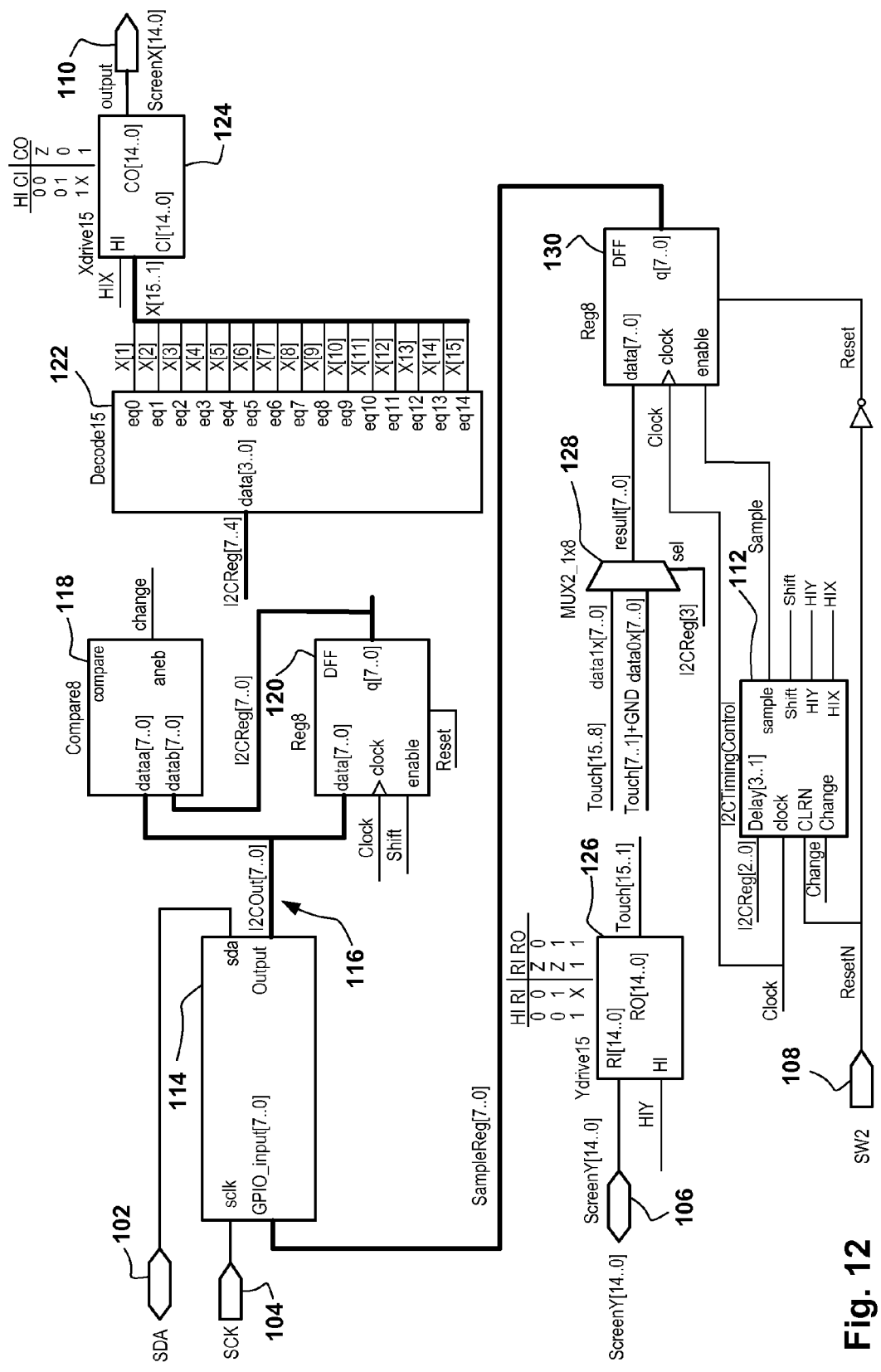
FIG. 12 illustrates an embodiment of a multi-touch decoder.

FIG. 12 illustrates an embodiment of a multi-touch decoder. The circuit in FIG. 12 implements the functionality of the I²C core module 154, timing module 158, and column driver module 160 of FIG. 10A. Timing control module 112 corresponds to the timing module described in FIGS. 10A, 10B, and 11. The inputs in FIG. 12 include SDA 102, SCK 104, ScreenY[14 . . . 0] 106, and SW2 108. The outputs include the vector ScreenX 110 that drives the columns of the screen, and ScreenY[14 . . . 0] 106, which is also an input. SDA 102 and SCK 104 implement the I²C interface for receiving scanning data. ScreenY[14 . . . 0] 106 corresponds to the data received from the screen. The circuit shown in FIG. 12 is related to a 15×15 screen, and therefore ScreenX and ScreenY are vectors with a dimension of 15, one item per row or column.

I2C_to_GPIO block 114 corresponds to a standard reference design that does all the protocol decoding for I²C and has GPIO_input and GPIO_output. When a processor does an I²C write, then GPIO_output 116 outputs the 8-bit value that was written through the I²C interface. This is an asynchronous communication because the I²C interface can place data on the I²C bus at any time.

Compare8 block 118 and Reg8 block 120 monitor the I²C bus and when the bus changes state, a Change signal is generated to notify the system that it is time to do a sample. Decode15 block 122 receives the top four bits (7 to 4) of I2CReg and, together with Xdrive15 driver 124, creates the signals that drive the columns. Xdrive15 driver 124 is a circuit that makes the columns float or be driven low depending on the HIX signal. When HIX is a logical high value, all the columns are driven to a logical low value, and when HIX is a logical low value the column with a logical high value input is driven low while the columns with a logical low value input float. Ydrive15 126 is controlled by signal HIY, such that when HIY is a logical high value, then all the rows are driven to a logical high value, and when HIY is a logical low value then the outputs of Ydrive15 126 are the same as the inputs. This is used to initialize the screen when HIY is a logical high value. When HIY is released to a logical low value, then the system is ready to take a sample.

Since the I²C interface is 8-bits wide and the data coming from the screen is 15 bits, then two 8-bit words are required to send the row information back. Multiplexer MUX2_1×8 128 outputs one half of the row data depending on the value of I2CReg[3] coming from Reg8 120, which depends on which half of the rows are being read in a particular I²C cycle. Thus, the input from the I²C bus includes 4 bits used by Decode15 to determine the column address (I2CReg[7 . . . 4]), 3 bits to determine the delay that is transmitted to I2CTimingControl 112 (I2CReg[2 . . . 0]), and one bit to determine which half of the rows are being read (I2CReg[3]). MUX2_1×8 128 determines if rows 1 to 7 are being read or 8 to 15. Reg8 130 reads data based on the delay that the timing block generates when the Enable input is on and sends the data to the I2C_to_GPIO block 114 for transmittal back to the processor.

Figure 13:
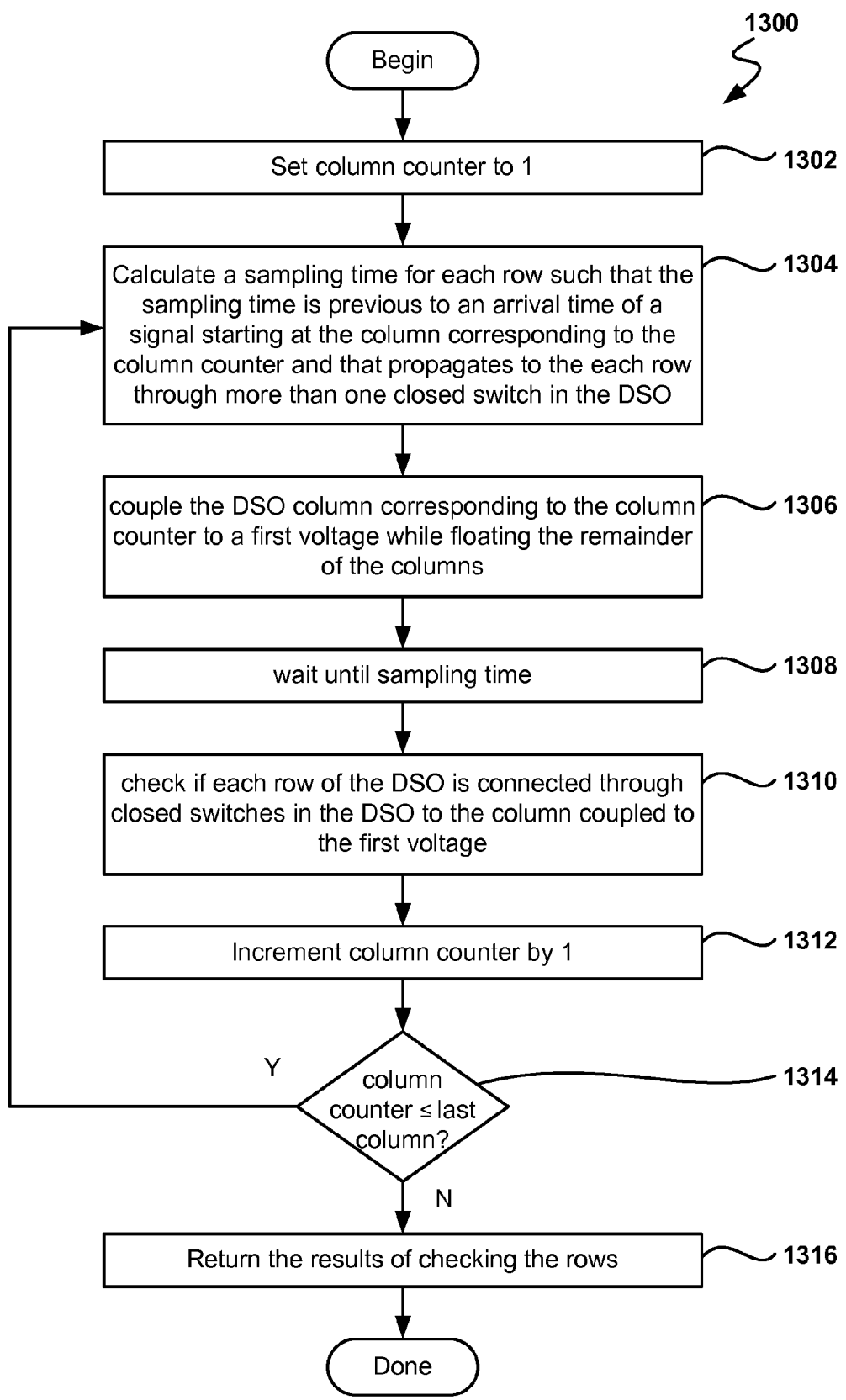
FIG. 13 shows the flow of an algorithm for decoding contacts in a DRSO, according to one embodiment.

FIG. 13 shows the flow of algorithm 1300 for decoding contacts in a DRSO, according to one embodiment. In operation 1302, the column counter is set to 1 and then the method continues to operation 1304, where a sampling time is calculated for each row. The sampling time is calculated such that the sampling time is less than an arrival time of a signal starting at the column corresponding to the column counter that propagates to the each row through more than one closed switch in the DRSO. The electrical circuit of FIG. 8A illustrates how signals that may cause a false decoding have a longer electrical path than signals propagating through just one switch. In one embodiment, the sampling time is calculated once per column and has the same value for all the rows. In another embodiment, different sampling times are used for different rows to fine tune the sampling time.

In operation 1306, the system couples the DRSO column corresponding to the column counter to a first voltage while floating the remainder of the columns. In one embodiment, column driver module 160 of FIG. 10A drives a selected column low. The system waits in operation 1308 until the sampling time arrives, which in one embodiment corresponds to state Wait 186 of FIG. 10B. After reaching the sampling time, the system checks if each row of the DRSO is connected through closed switches in the DRSO to the column coupled to the first voltage. In the system of FIG. 10A, I²C core module 154 receives data input from the connected rows and does the check to determine if the rows are connected to the column coupled to the first voltage. In operation 1312, the column counter is incremented by 1, and in operation 1314 the column counter is compared against the number for the last column to determine if the process flows back to operation 1304 or if the process continues to operation 1316.

It should be noted that the embodiment shown in FIG. 13 successively couples the columns of the DRSO to the first voltage. In another embodiment, the columns can be sampled in a different order. In yet another embodiment, only one column is coupled at a time, and a processor, or other entity originating the request, determines which column to sample each time. Additionally, other methods allow the requesting processor to determine the sampling time, such as setting the delay count of FIGS. 10A-B, instead of being calculated by the system testing the screen overlay for contacts. In operation 1316, the results obtained from sampling the row inputs are returned. In the embodiment illustrated in FIG. 10A, I²C core module 154 returns the results to processor 152.

The methods and systems, for decoding contacts in a DRSO, described herein may be incorporated into any suitable integrated circuit. For example, the methods and systems may be incorporated into other types of programmable logic devices such as programmable array logic (PAL), programmable logic array (PLA), field-programmable gate array (FPGA), field programmable logic array (FPLA), electrically programmable logic devices (EPLD), electrically erasable programmable logic device (EEPLD), logic cell array (LCA), Application-Specific Integrated Circuit (ASIC), Structured ASIC, Application Specific Standard Product (ASSP), just to name a few. The programmable logic device may be a part of a data processing system that includes one or more of the following components: a processor, memory; I/O circuitry, and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

One or more embodiments of the present invention can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for decoding contacts in a digital resistive screen overlay (DRSO), the method comprising:
   successively coupling columns of the DRSO to a first voltage while floating a remainder of the columns; and
   checking during a sampling time if each row of the DRSO is coupled through closed switches in the DRSO to the column coupled to the first voltage, wherein the sampling time for each row is less than an arrival time of a signal that started with the coupling and that propagated to each row through more than one closed switch in the DRSO, wherein the sampling time is adjusted according to one of the row of the DRSO being checked or the column being coupled.

2. The method as recited in claim 1, wherein a maximum value for the sampling time is equal to a time required for a signal to travel from an input attached to the column being driven to a furthest row output from the input.

3. The method as recited in claim 1, further including:
receiving control data that includes a column address and a delay count;
coupling to the first voltage a column associated with the column address; and
calculating the sampling time based on the delay count.

4. The method as recited in claim 1, wherein the signal that propagated to the each row through more than one closed switch propagates through first, second, and third switches in the DRSO, the first and the second switches being in a same row of the DRSO, the second and third switches being on a same column of the DRSO.

5. The method as recited in claim 1, wherein each row of the DRSO is coupled to a second voltage through a resistor such that each row generates an output associated with the first voltage whenever there is an electrical path from the first voltage to a row output through the DRSO.

6. The method as recited in claim 1, wherein each column of the DRSO is coupled to an output of a corresponding buffer having an input coupled to the first voltage and an output enable pin coupled to a corresponding column register, wherein columns of the DRSO are one of connected to the first voltage or floated according to a logical value of the corresponding column register.

7. An Integrated Circuit (IC) for decoding contacts in a digital resistive screen overlay (DRSO), the IC comprising:
a column driver module that couples a column of the DRSO corresponding to a received column address to a first voltage while floating a remainder of the columns;
a core module that sends the column address to the column driver module and checks during a sampling time if each row of the DRSO is coupled through closed switches in the DRSO to the first voltage; and
a timing module that determines the sampling time such that the sampling time for each row is less than an arrival time of a signal that started with the coupling of the column and that propagated to each row through more than one closed switch in the DRSO.

8. The IC as recited in claim 7,
wherein the core module sends a change signal to the timing module indicating that a new request is available;
wherein the timing module sends a timing signal to the core module to load data for the new request, the data for the new request including a delay count and the column address.

9. The IC as recited in claim 8,
wherein the timing module sends a column timing signal to the column driver module to perform the operation of coupling the column to the first voltage;
wherein the sampling time for each row is adjusted based on the delay count.

10. The IC as recited in claim 9, wherein the timing module implements a state machine including four states:
a reset state where the state machine waits for the change signal;
a shift state where the timing module sends the timing signal to the core module, the state machine transitioning to the shift state from the reset state after receiving the change signal;
a wait state where the timing module sends column timing signal and where the state machine waits for a period of time indicated by the delay count, the state machine transitioning to the wait state from the shift state; and
a sample state where the timing module sends a read signal to the core module to sample row inputs from the DRSO, the state machine transitioning to the sample state from the wait state after an end of the period of time indicated by the delay count, wherein the state machine transitions to the reset state from the sample state.

11. The IC as recited in claim 8, wherein the timing module sends an interrupt signal to the core module in order for the core module to send the obtained DRSO information.

12. The IC as recited in claim 7, further including:
a processor that sends a request to the core module to obtain data from the DRSO, the processor receiving results from obtaining data from the DRSO back from the core module.

13. The IC as recited in claim 12, wherein the core module uses time division multiplexing (TDM) to send the results to the processor.

14. The IC as recited in claim 7, further including:
one flip-flop per row input from the DRSO, the flip-flop loading the input from the corresponding row from the DRSO during the sampling time; and
one resistor per row input from the DRSO, the resistor coupled to the corresponding row input from the DRSO;
wherein the flip-flop is loaded with a first logic value when the corresponding row is coupled to a row that is not floating during the sampling time, and a second logic value otherwise.

15. An Integrated Circuit (IC) for decoding contacts in a digital resistive screen overlay (DRSO), the IC comprising:
an input/output (I/O) module that reads control data which includes a column address and a delay counter;
a column decoder that receives the column address and couples a column of the DRSO corresponding to the column address to a first voltage while floating a remainder of the columns;
a row data register that receives logical values of the rows of the DRSO; and
a timing control module that generates,
a column signal to indicate when the column decoder starts coupling the column, and
a row signal to indicate when to read the logical values of the rows, the row signal being based on the delay counter;
wherein the I/O module returns the logical values of the rows from the row data register.

16. The IC as recited in claim 15, wherein the I/O module implements Inter-Integrated Circuit ($I^2C$) protocol for receiving and sending data.

17. The IC as recited in claim 16, wherein a first $I^2C$ address is used to write the control data and a second $I^2C$ address is used to read the logical values of the rows.

18. The IC as recited in claim 16, wherein the I/O module receives a contact detect request to detect if there is a contact in the DRSO, the column decoder driving all the columns to the first voltage contemporaneously in response to the contact detect request, the I/O module returning a contact logical value indicating if there is contact in the DRSO, the contact logical value being obtained by performing a logical OR of all the logical values of the rows.

19. The IC as recited in claim 18, wherein the contact detect request is performed periodically when a processor is in a low power standby state, wherein the IC uses an interrupt to wake the processor when a contact is detected.

20. The IC as recited in claim 15, wherein the I/O module implements a protocol for receiving and sending data selected from a group consisting of Joint Test Action Group (JTAG), Secure Digital Input Output (SDIO), System Management Bus (SMBus), System Packet Interface (SPI), Power Management Bus (PMBus), Z80, 8088, 6800, 8051, or a proprietary protocol.

* * * * *